W. B. POTTER.
STARTING AUTOMOBILE VEHICLES.
APPLICATION FILED APR. 21, 1916.
1,280,832.
Patented Oct. 8, 1918.
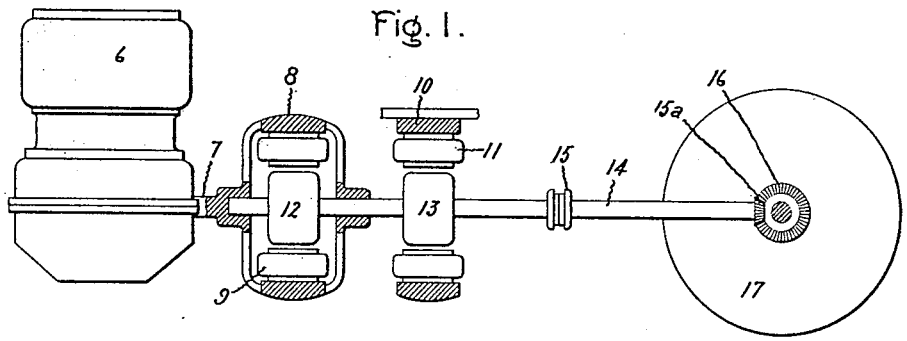
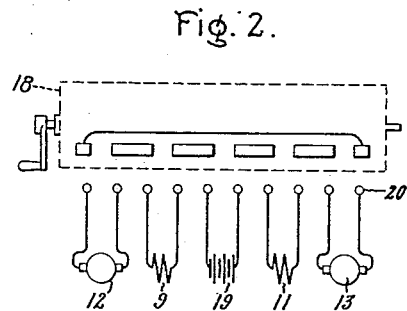
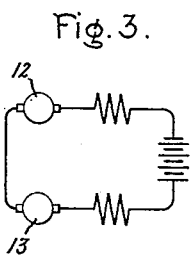
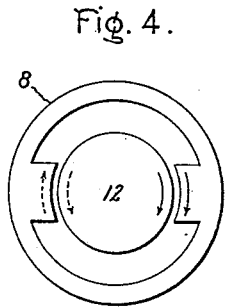
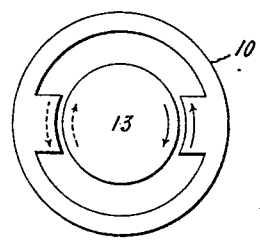
Inventor:
William B. Potter,
by Albert G. Davis
His Attorney.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

STARTING AUTOMOBILE VEHICLES.

1,280,832.　　　　Specification of Letters Patent.　　Patented Oct. 8, 1918.

Application filed April 21, 1916.　Serial No. 92,738.

*To all whom it may concern:*

Be it known that I, WILLIAM B. POTTER, a citizen of the United States, residing at Schenectady, in the county of Schenectady, State of New York, have invented certain new and useful Improvements in Starting Automobile Vehicles, of which the following is a specification.

The present invention relates to the starting of self propelled vehicles of the type wherein an internal combustion engine is employed as the source of power, and electrical apparatus is utilized to convey the power developed by the engine to the vehicle propelling means, as for example, the road wheels. One very satisfactory type of apparatus now in use for this purpose comprises a direct current electric generator and a direct current electric motor, the armatures of the two machines being mechanically connected together, and also mechanically connected to the road wheels. The field magnet of the generator is rotated by the engine at varying speeds as the admission of fuel to the engine is varied. The field magnet of the motor is mounted on the same frame which supports the engine, i. e. the chassis and is held against rotation. As the field magnet of the generator is revolved by the engine it drags its armature around with it and also the motor armature, but at a lesser speed. This difference in speed or slip between the generator field magnet and its armature generates current, which in turn is supplied to the motor armature, and the torque of the motor is in this manner added to that due to the turning effect of the engine on the generator field magnet. By varying the circuit connections of the generator and motor, as for example by varying the strengths of the field magnets, the torque and speed developed at the road wheels can be changed at will and over wide range. For maximum speeds the motor can be cut out of circuit, as for example, by short circuiting it, or it may be employed as a constant current generator for charging the storage battery used for starting and lighting purposes.

Owing to the arrangement of the electric motor it is not available for starting the engine and so the generator has to be temporarily converted into a motor for the purpose and connected to the storage battery. To accomplish this result the armature of the generator must be held stationary in order that the field magnet may be revolved with respect thereto to turn over the engine. This is commonly done, first by applying the brakes to the driving road wheels by use of a hand lever, for without such braking the generator acting as a motor will propel the vehicle backward; and second, by moving the controller to connect the battery with the generator. It will readily be seen under these conditions, that if for any reason the operator neglects to set the brakes an accident may occur, particularly in a crowded street, or in a garage, where space is usually at a premium.

The object of my invention is to provide an arrangement of parts which renders it unnecessary to set the vehicle brakes in starting, and in which the action required to admit current from the battery to the generator for starting also establishes such circuit connections of the electrical apparatus as a whole that the vehicle cannot, during the starting operation, be propelled backward.

In the accompanying drawing which illustrates one of the embodiments of my invention, Figure 1 is a view more or less diagrammatic of a combined engine and electric power transmitting system; Fig. 2 is a diagram of the controller and circuit connections for starting; Fig. 3 is a diagram illustrating the circuits of the generator and motor during the starting period, and Figs. 4 and 5 show the reactions that take place in the generator and motor.

I have not illustrated the circuits of the generator and motor when they are acting to propel the vehicle since they are unnecessary to an understanding of my invention, and because any suitable or well known circuit arrangements may be utilized for the purpose.

6 indicates an internal combustion engine of any suitable type, such for example as the ordinary automobile engine having any desired number of cylinders and reciprocating pistons connected to the crank shaft. The main crank shaft 7 of the engine is connected to and drives the field magnet 8 of the generator, said magnet having suitable pole pieces and series field windings 9. 10 indicates the field magnet of the motor which is held against rotation in any suitable manner, as for example by fastening it to the vehicle frame which also supports the engine and other parts commonly employed in such an installation. This magnet is also provided with pole pieces and series field windings 11.

The armature 12 of the generator and armature 13 of the motor are mounted in such manner as to rotate as a unit. They are connected to the propeller shaft 14 by a releasable jaw clutch 15 controlled by a hand lever, not shown. On the rear end of the shaft is a pinion 15ª meshing with a bevel gear 16 forming a part of the usual differential for driving the road wheels 17, of which one is shown.

As before stated, the customary practice in starting is to use the generator as a motor and set the brakes of the road wheel. In this connection it is to be understood that if the power required to turn the engine is less than that required to move the vehicle backward the engine will turn without the vehicle moving. This uncertainty, however, is of itself a source of danger as it tends to make the operator less careful than he should be. In carrying out my invention I utilize both electric machines in starting and so connect them that the force tending to turn the generator armature in one direction is balanced by a similar force tending to turn the motor armature in the opposite direction. The use of both electrical machines in starting is not a disadvantage because they have to be provided in any case.

In Figs. 4 and 5 the full line arrows indicate the direction of turning of armatures during normal propelling operation, and also the reactions of the armatures in the field magnets. The dotted line arrows indicate the direction of the reactions on the field magnets during the starting operation and also the directions that the armatures tend to turn.

In Fig. 2 is shown a controller drum 18 of any suitable construction that is adapted to be moved by a handle in the ordinary way, as for example by rotating it on a spindle. This controller drum is provided with a set of contacts for starting purposes, together with any other desired contacts for controlling the circuit relations of the two machines during running of the vehicle, these latter contacts have been omitted for the sake of simplicity. 19 indicates a storage battery, 12 the armature of the generator, 9 the field winding therefor, 13 the motor armature, and 11 the field winding therefor. The field windings and armatures are so designed that the same current flowing through them produce substantially equal torques. The leads or conductors from the battery, armatures and field windings extend to contacts or brushes 20 mounted in a row on a suitable support. In starting, the first row of contacts on controller 18 is moved into engagement with the brushes and current flows from the battery through both sets of field windings and armatures as indicated in Fig. 3, said windings being so arranged as to cause the generator armature 12 to tend to turn in the direction indicated by the dotted line arrow in Fig. 4, and the motor armature 13 to tend to turn in the direction indicated by the dotted line arrow in Fig. 5. As the torques exerted by the two armatures are equal and opposite, said armatures will stand still while the reactive effect of the generator armature on its field will cause the latter to rotate and with it the main shaft of the engine until the engine begins to fire, after which the controller is moved to the proper position to establish the desired circuit connections between the machines to cause the engine to propel the vehicle either forward or backward as desired, the speed of the engine being varied in the usual manner by changing the amount of fuel admitted thereto.

It will be seen that my improved arrangement has the advantage that a single operation only is required in starting—the operator merely has to move the controller handle to the starting position.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of starting the engine of a vehicle having an internal combustion engine and a system of electric power transmission between said engine and the load comprising two dynamo electric machines, one of said machines having a member rotated by the engine and a second rotary member connected to the load, the second machine having a fixed member and a member connected to the load, which consists in admitting current from a separate source of supply to all the members of said transmission and in such manner that the torque of the machine having the fixed member is opposed to the torque of the member of the first named machine which is connected to the load, thereby permitting the other member to start the engine.

2. A system of propulsion, comprising an internal combustion engine, a dynamo electric machine, one member of which is connected to the engine and the other to the load, a second dynamo electric machine, one member of which is stationary and the other connected to the load, in combination with an external source of current, and a controller having its contacts and connections arranged to connect the load driving members with said source in such manner that the tendency of one of them to turn is balanced by the other, thus permitting the reactive effect between the members of the first mentioned dynamo electric machine to start the engine.

3. A system of propulsion, comprising an internal combustion engine, a series wound dynamo electric machine, one member of which is connected to the engine and the other to the load, a second series wound dynamo electric machine, one member of which is stationary and the other connected to the load, in combination with an external source of current, and a controller having its contacts and connections arranged to admit current from said source to both machines in such manner that the tendency of the load driving member of one machine to turn is counteracted by the joint action of members of the second machine, and the reactive effect between the members of the first machine causes the member connected to the engine shaft to rotate about the other for starting the engine.

4. A system of propulsion, comprising an internal combustion engine, a dynamo electric machine, the field magnet of which is connected to the engine and the armature to the load, a second dynamo electric machine, the field magnet of which is stationary and the armature connected to the load, in combination with a storage battery, and a controller having its contacts and connections arranged to admit current in the field winding and armatures of both machines in series and in such direction that the tendency of one of the armatures to move the load is counteracted by the other armature and its field, thus permitting the reactive effect between the armature and field of the first mentioned dynamo electric machine to rotate the engine shaft for starting the engine.

5. A system of propulsion comprising a prime mover, a dynamo electric machine, one member of which is rotated by the engine shaft, the other driving the load, a second dynamo electric machine, one member of which assists in driving the load, the load driving members of both machines being mechanically united, a propeller shaft for connecting the load driving members with the load, in combination with an external source of current, and controlling means arranged to admit current to both rotating members for the purpose of starting the engine and in such manner that the tendency of one load driving member to turn in one direction is counter-balanced by the tendency of the other load driving member to turn in the opposite direction, thereby permitting the reactive effect between the members of the first named machine to rotate the engine shaft.

In witness whereof, I have hereunto set my hand this 20th day of April, 1916.

WILLIAM B. POTTER.

Copies of this patent may be obtained for five cents each, by addressing the "Commissioner of Patents, Washington, D. C."